US006971698B1

(12) United States Patent
King

(10) Patent No.: US 6,971,698 B1
(45) Date of Patent: Dec. 6, 2005

(54) STORAGE POCKET ASSEMBLY FOR A VEHICLE DOOR TRIM PANEL

(75) Inventor: Michael J. King, Dryden, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/053,963

(22) Filed: Feb. 9, 2005

(51) Int. Cl.$^7$ ................................................ B60N 3/12
(52) U.S. Cl. .............................. 296/37.13; 296/146.7; 224/544
(58) Field of Search ........................... 296/37.1, 37.13, 296/37.5, 37.8, 146.7, 1.08; 224/544, 539

(56) References Cited

U.S. PATENT DOCUMENTS

| | | | |
|---|---|---|---|
| 1,523,323 A | * | 1/1925 | Wensinger ................ 296/37.13 |
| 4,619,477 A | * | 10/1986 | Kneib et al. .............. 296/37.13 |
| 5,535,571 A | | 7/1996 | Nichols |
| 5,820,191 A | | 10/1998 | Blakewood, Jr. et al. |
| 5,934,532 A | * | 8/1999 | Rausch et al. .............. 224/544 |
| 6,116,672 A | * | 9/2000 | Cannon et al. ........... 296/37.13 |
| 6,183,038 B1 | | 2/2001 | Hansen et al. |
| 6,196,606 B1 | | 3/2001 | McGoldrick |
| 6,471,276 B1 | | 10/2002 | Brunsman et al. |
| 6,880,874 B1 | * | 4/2005 | Kallenberger et al. ... 296/37.13 |

FOREIGN PATENT DOCUMENTS

JP            57198138 A  * 12/1982 ................. 296/37.8

* cited by examiner

Primary Examiner—Jason Morrow
(74) Attorney, Agent, or Firm—MacMillan, Sobanski & Todd, LLC

(57) ABSTRACT

A vehicle trim component defining a storage pocket for mounting on a door panel is formed from first and second portions integrally attached to one another by a living hinge, to initially form a clamshell-type structure. The first portion defines a back wall of the storage pocket. The second portion defines a pair of opposed side walls of the storage pocket. The first and second portions are folded together about the living hinge to form the storage pocket. At least one fastening mechanism connects the first portion to the second portion when the first portion is rotated about the living hinge to the final assembly position adjacent the second portion.

19 Claims, 3 Drawing Sheets

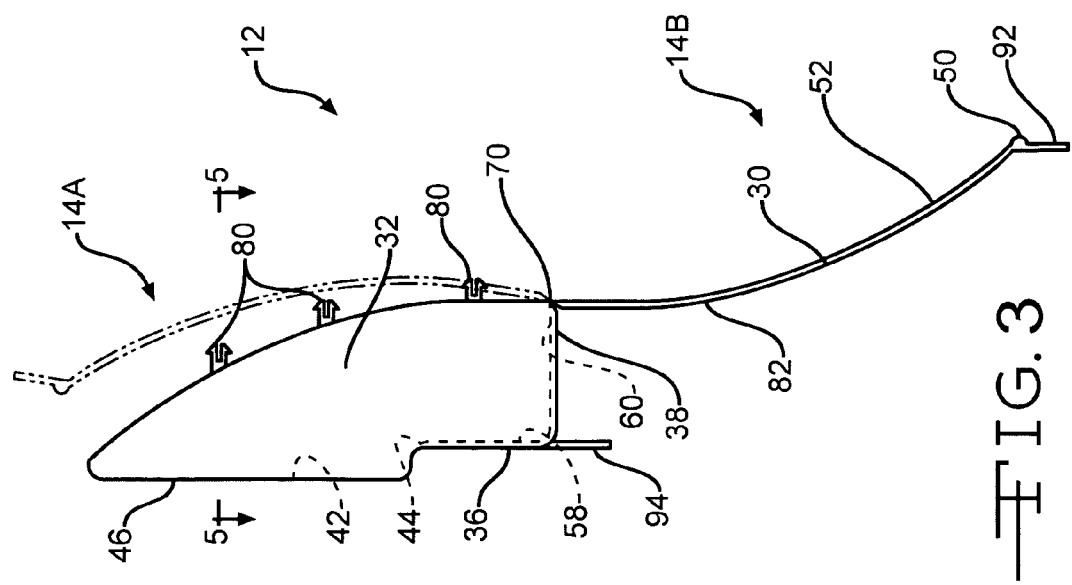
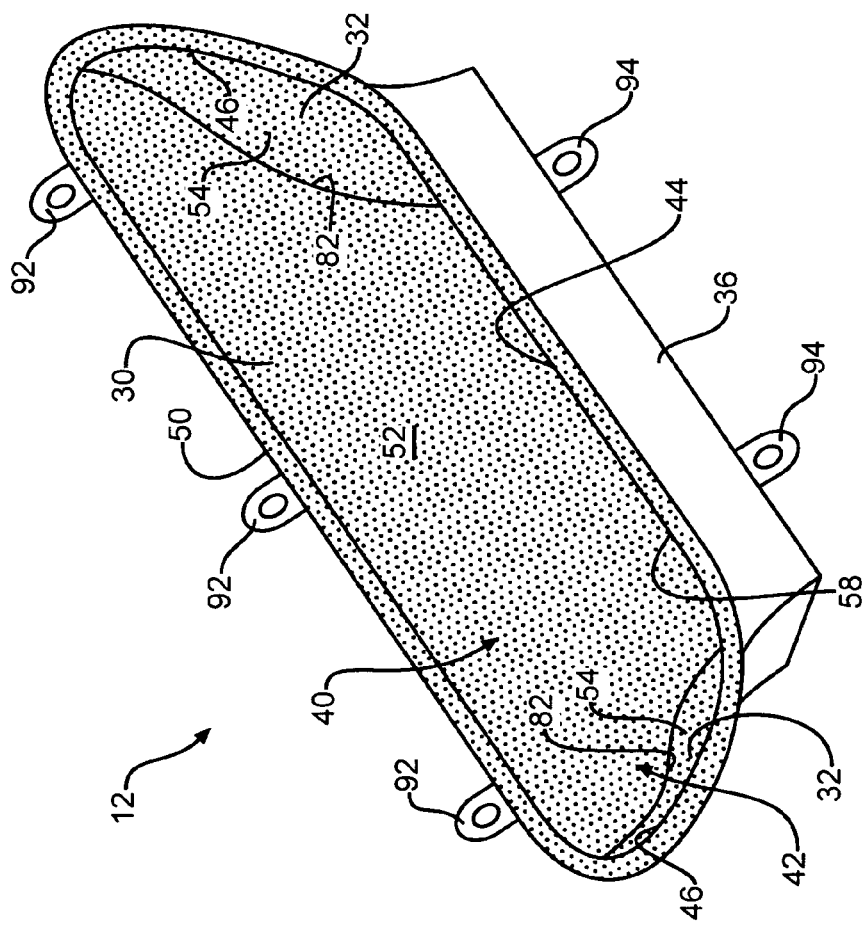

STORAGE POCKET ASSEMBLY FOR A VEHICLE DOOR TRIM PANEL

BACKGROUND OF THE INVENTION

This invention relates in general to vehicle trim components, and in particular to a trim component forming a storage or map pocket to be mounted on the vehicle door panel.

Commonly, a vehicle door includes an outer metal structure or frame which is hingedly connected to the frame of the vehicle. One or more trim panels are then mounted on the inboard side of the vehicle door frame which faces the interior of the passenger compartment. The trim panels provide an aesthetically pleasing appearance for the door. The trim panels also as cover various door mechanisms such as locks, windows, window controllers, and mirror controllers. The door trim panel may also include features such as an armrest and a integral beverage holder. An increasing popular feature is a storage pocket within the trim panel. The storage pocket can be used by an occupant for the convenient storage of items, such as maps and other relatively small items. Thus, storage pockets integral with the door trim panel are often referred to as map pockets. Typically, map pockets are defined by an opening through the door trim panel to provide access to the pocket. The opening of the map pocket is often located at the upper portion of the storage compartment so that the front bottom portion of the storage compartment defines a generally vertical wall of the compartment.

Map pockets can be created integrally within the door trim panel by forming a projection region outwardly towards the passenger compartment and then providing a separate panel attached to the rear outboard surface of the trim panel. This type of map pocket protrudes into the passenger compartment. Another type of map pocket such as a recessed map pocket can also be formed within the door assembly such that the storage compartment of the map pocket is generally located between the trim panel and the outer metal panel of the vehicle door. An aperture in the door trim panel defines the opening into the map pocket. Generally, these types of map pockets are formed by a separate map pocket assembly which is fastened to the rear surface of the trim panel. The map pocket assembly includes a front portion and a separate rear portion which are connected together to form the map pocket assembly and define the storage compartment. The rear portion defines a rear wall of the map pocket assembly. The front portion defines a lower front wall and a pair of side walls. The region above the lower front wall is generally open to provide access to the storage compartment of the map pocket. The map pocket assembly is then attached to the rear surface of the door trim panel such that the opening of the map pocket is generally aligned with an opening formed in the door trim panel.

It has become increasingly desirable to provide an aesthetically and tactile pleasing surface on the interior walls of the map pocket. For example, the interior wall surfaces can be flocked. Flocking, as is conventional in the art, is the adhesion of short flocking fibers to the interior surfaces of the compartment. The fibers are adhered to the surfaces by a spraying technique well known in the art, to uniformly adhere the fibers to the surface to provide a short soft dense warp pile. These fibers generally project perpendicularly outwardly from the surface. Common fiber materials include textile fibers, such as cotton, and synthetics, such has polyesters. To provide flocking on a recessed map pocket, the interior surface of the rear portion of the conventional map pocket is flocked. The interior surfaces of the side walls and front wall of the front portion are also flocked in a separate operation. The front and rear portions are then fastened together by a sonic welding operation. The peripheral edges of the rear portion are sonically welded to corresponding mating edges of the side walls and with a lower edge of the front wall or a bottom wall of the front portion of the map pocket assembly. Although this technique has proven to be successful, it is important to mask the mating peripheral edges of the mating sonic welded surfaces during the flocking process to provide proper welding when the surfaces are later welded together. Unfortunately, this masking can be complicated to perform. To avoid this problem, the interior surfaces of the map pocket assembly can be flocked after being attached together by sonic welding. However, this technique also has problems due to the inherently difficult procedure in spraying the flocking material into a relatively small interior compartment. Complex spraying tools are needed for providing the flocked surfaces and often results in adhering the flocking fibers in a non-uniform manner to the interior surfaces.

BRIEF SUMMARY OF THE INVENTION

This invention relates to a storage pocket assembly which can be attached to another trim panel, such as a door panel.

The vehicle trim component, or storage pocket assembly, is formed from first and second portions integrally attached to one another by a living hinge, to initially form a clamshell-type structure. The first portion defines a back wall of the storage pocket. The second portion defines a pair of opposed side walls of the storage pocket. The first and second portions are folded together about the living hinge to form the enclosed storage pocket. At least one fastening mechanism connects the first portion to the second portion when the first portion is rotated about the living hinge to the final assembly position adjacent the second portion.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a perspective view of the storage pocket assembly of FIG. 1 shown in its final assembly position.

FIG. 3 is a side elevational view of the storage pocket assembly, wherein the storage pocket assembly is illustrated in an initial assembly position.

DETAILED DESCRIPTION OF THE INVENTION

Figure 1:
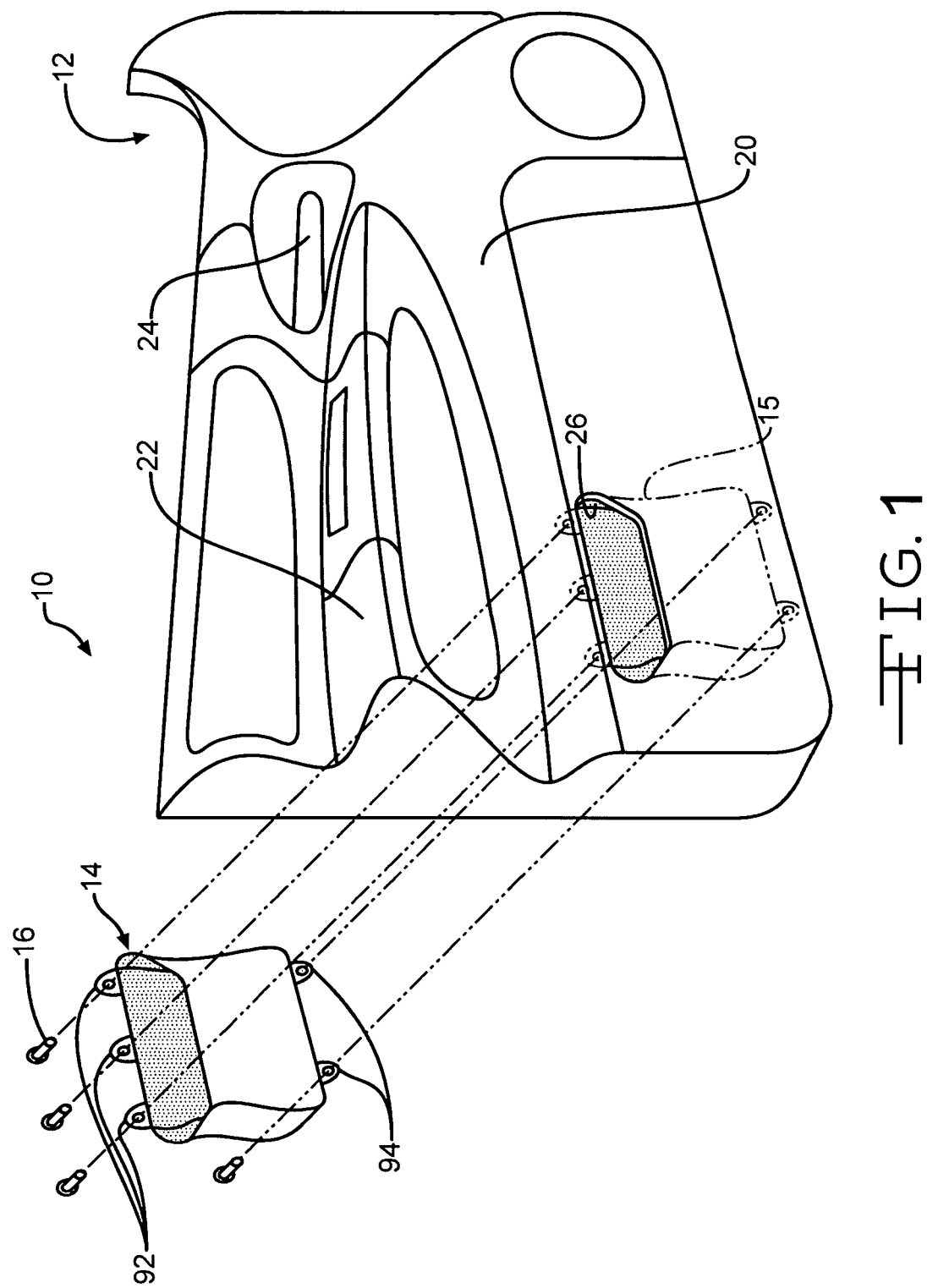
FIG. 1 is an exploded perspective view of a vehicle door panel assembly including a door trim panel and a storage pocket assembly, in accordance with the present invention, prior to installation of the storage pocket assembly onto the rear surface of the door trim panel.

Referring now to the drawings, there is illustrated in FIG. 1 a door panel assembly, indicated generally at 10. The door panel assembly 10 generally includes a door panel 12 and a storage pocket assembly 14. As will be explained below, the storage pocket assembly 14 can be attached to the door panel 12, as shown in its installed position represented by broken lines 15 in FIG. 1, by a plurality of fasteners 16.

The door panel 14 is adapted to be mounted on a conventional outer metal door frame of a vehicle. The door panel 12 includes a front surface 20 and a rear surface (hidden from FIG. 1). The front surface 20 faces the interior of the passenger compartment of the vehicle. The door panel 12 can be any suitable configuration and can be made of any suitable material, such as a plastic or composite material. The door panel 12 may also be an assembly formed from a plurality of panels and components. For example, the door panel 12 may be formed from a plurality of panels having different aesthetically pleasing colors and textures. The door panel 12 may also include features such as an armrest 22 and a door handle 24 mounted thereon. The door panel 12 may also include other components not illustrated here, such as windows, window lifting mechanisms, door locks, side view mirrors, electrical controls, speakers, etc. The door panel 14 includes an opening 26 formed therein. The opening 26 provides access to the interior storage compartment of the storage pocket assembly 14.

Figure 4:
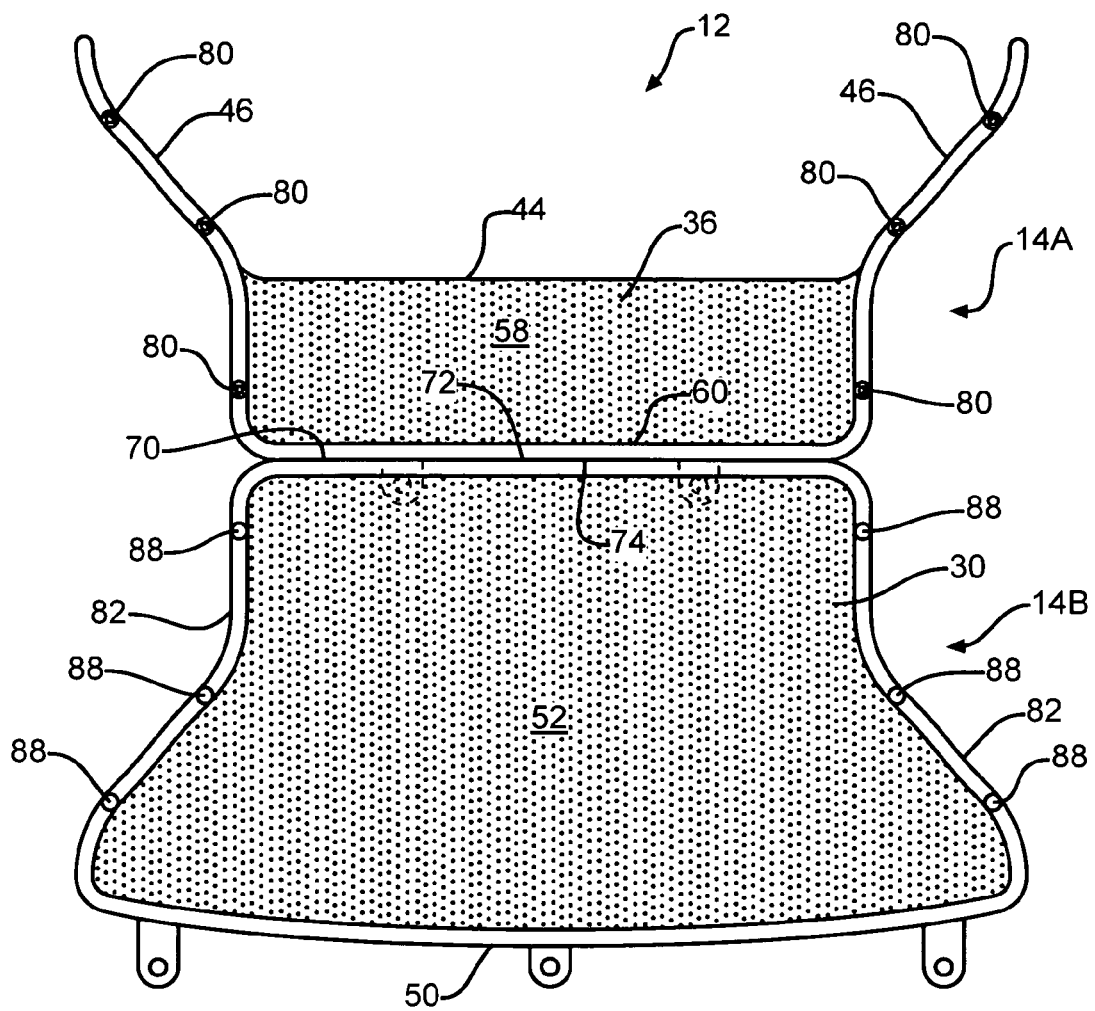
FIG. 4 is a rear elevational view of the storage pocket assembly of FIG. 3.

As will be discussed in detail below, the storage pocket assembly 14 is initially formed or manufactured with an open clamshell-type configuration, as shown in FIGS. 3 and 4, such that portions of the storage pocket assembly 14 can be folded and attached together to form a hollow storage compartment having an access opening. Once folded and attached together forming a final assembly position, as shown in FIGS. 1 and 2, the storage pocket assembly 14 can then be attached to the rear surface of the door panel 12 such as by the fasteners 16. As shown in FIGS. 1 and 2, the storage pocket assembly 14 generally includes a back wall 30, a pair of opposed side walls 32, a front wall 36, and a bottom wall 38. As shown in FIG. 2, the back wall 30, the side walls 32, the front wall 36, and the bottom wall 38 define a hollow storage compartment 40 therein. Although not limited to this configuration, the storage pocket assembly 14 includes an opening 42 defined by an edge 44 of the front wall 36, edges 46 of the side walls 32, and an upper edge 50 of the back wall 38. When installed onto the door panel 12, the opening 42 generally defined by the edges 44, 46, and 50 is in a generally vertical plane generally co-planar with the door panel 12 and its opening 26. Although the storage pocket assembly 14 is shown and described as having a back wall 30, a pair of opposed side walls 32, a front wall 36, and a bottom wall 38, it should be understood that the storage pocket assembly 14 can be formed and shaped with any suitable configuration having a hollow interior.

The back wall 30 includes an interior surface 52. The side walls 32 include interior surfaces 54. The front wall 36 includes an interior surface 58. The bottom wall 38 includes an interior surface 60. Preferably, the interior surfaces 52, 54, 56, 58, and 60 of the storage pocket assembly 14 are flocked to provide an aesthetically pleasing appearance. The flocked surfaces 52, 54, 58, and 60 also provide a pleasing tactile feel to the surfaces 52, 54, 58, and 60. The flocked surfaces 52, 54, 58, and 60 include short flocking fibers adhered to the surfaces 52, 54, 58, and 60 providing a short soft dense warp pile. The flocking may be applied by any conventional manner, such as by spraying, as will be described below.

As stated above, the storage pocket assembly 14 is initially formed or manufactured with an open clamshell-type configuration, as shown in FIGS. 3 and 4, such that portions of the storage pocket assembly 14 can be folded and attached together to form the hollow storage compartment 40. As shown in FIGS. 3 and 4, the back wall 30 of the storage pocket assembly 14 is attached to the bottom wall 38 by a living hinge 70. The living hinge 70 is formed at the junction of a lower edge 72 of the back wall 30 and a rear edge 74 of the bottom wall 38. The living hinge 70 is preferably a relatively thin narrowed portion between these edges 72 and 74 which permits flexing of the material the storage pocket assembly 14 is made of so that the back wall 30 may rotate relative to the bottom wall 38. The back wall 30 generally defines a first portion (indicated generally at 14a), and the front wall 36, the bottom wall 38, and the side walls 32 and 34 define a second portion (indicated generally at 14b), such that the first portion may pivot relative to the second portion during final assembly of the storage pocket assembly 14. The first portion, the second portion, and the living hinge 70 are integrally formed together.

Figure 5:
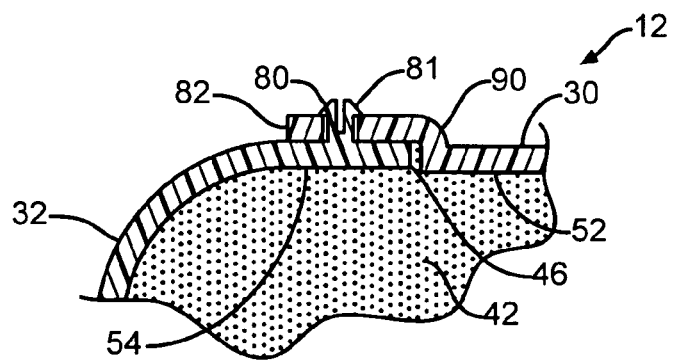
FIG. 5 is a partial cross sectional view of a rear portion of the storage pocket assembly when in its final assembly position.

The back wall 30 includes the upper edge 50, and side edges 82. The storage pocket assembly 14 preferably includes integrally formed fasteners 80 to connect the back wall 38 to the first portion 14a. As shown in the embodiment of the storage pocket assembly 14 illustrated in FIGS. 1 through 5, a plurality of fasteners 80 extend rearwardly outwardly from side edges 82. The fasteners 80 can be any suitable conventionally known fastening structure for connecting the first and second portions 14a and 14b together. An example of a suitable fastener 80 is shown in FIG. 5 and is a push-fit resilient fastener having a mushroomed head, as best shown in FIG. 5, which resiliently flexes and is positioned in corresponding apertures 88 formed in the back wall 30. Preferably, the fasteners 80 include a mushroomed or enlarged head 81 slightly larger than the width of the apertures 80 so that once flexed and pushed through the apertures 88, the enlarged head 81 retains the back wall 30 from moving relative to the first portion 14a. Another example of a suitable fastener 80 is a Christmas tree type fastener. A Christmas tree type fastener is well known in the art, and provides a series of resilient fins capable of different levels of axial retention and grip ability. A Christmas tree type fastener typically includes fins which flex inward during application and retract outward once inserted, thereby creating an axial force which holds respective members, e.g. the back wall 30 and first portions 14a, together. It should be understood that and other desired fastening structure may be used for the fasteners 80.

Once the back wall has moved into its final assembly position, as shown in FIGS. 1 and 2, the edges 46 of the side walls 32 abut the corresponding edges 82 of the back wall 30. Preferably, the edges 46 and 82 are formed so that when viewing the flocked interior surfaces 52 and 54 they are generally flush with one another, assisting in hiding the seam between the two 46 and 82. An embodiment of this flush arrangement is shown in FIG. 5. The edge 82 of the back wall 30 includes a recessed portion 90 which extends rearwardly. The recessed portion 90 is offset in a rearwardly direction by a distance approximately equal to the thickness of the edge 46 of the corresponding side walls 32. Thus, the flocked surface 52 of the back wall 30 and the flocked surface 54 of the side wall 32 are generally flush, thereby minimizing the observation of the seam between the edges 46 and 82.

As stated above, the storage pocket assembly 14 can be attached to the door panel 12 by a plurality of fasteners 16. Preferably, the storage pocket assembly 14 has integrally formed mounting features which permits the fasteners 80 to be used to attached the storage pocket assembly 14 to the door panel 12. As best shown in FIGS. 1 and 2, the mounting features can be a plurality of integrally formed tabs 92 and 94. The tabs 92 extend outwardly from the edge 50 of the back wall 30. The tabs 94 extend outwardly from the bottom wall 38. Preferably, the tabs 92 and 94 include an aperture formed therethrough for receiving the fasteners 16.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle trim component defining a storage pocket for mounting on a door panel, said component comprising:
    a first portion defining a back wall of the storage pocket;
    a second portion defining a pair of opposed side walls of the storage pocket, said second portion separated from said first portion by a living hinge formed integrally with said first and second portions, said living hinge permitting said first portion to pivot relative to said second portion during assembly of the storage pocket; and
    at least one fastening mechanism connecting said first portion to said second portion when said first portion is rotated about said living hinge to a final assembly position adjacent said second portion to form the storage pocket.

2. The trim component of claim 1, wherein said trim component is formed from an injection molding operation such that said first portion, said second portion, and said living hinge are integrally formed of a common material.

3. The trim component of claim 1, wherein said material is plastic.

4. The trim component of claim 1, wherein said trim component is initially formed such that said first portion extends outwardly from said second portion at said living hinge, and wherein said first portion is rotated approximately 180 degrees about said living hinge to the final assembly position to form the storage pocket.

5. The trim component of claim 1, wherein said back wall of said first portion is flocked.

6. The trim component of claim 1, wherein said side walls of said second portion are flocked.

7. The trim component of claim 1, wherein said second portion further includes a front wall disposed between said walls such that said side walls extend higher than an upper edge of said front wall to define an opening of the storage pocket.

8. The trim component of claim 7, wherein said front wall is flocked.

9. The trim component of claim 1, wherein said at least one fastening mechanism is integrally formed in one of said first and second portions.

10. The trim component of claim 9, wherein said trim component includes a plurality of fastening mechanisms located at opposed lateral edges of said first portion.

11. The trim component of claim 9, wherein said at least one fastening mechanism comprises a resilient snap fit connector, which said at least one fastening mechanism is integrally formed in one of said first and second portions, and cooperatively mates with an aperture formed in the other of the first and second portions.

12. The trim component of claim 1, wherein said side walls include a recessed edge, and wherein said first portion defines a peripheral edge which abuts said recessed edge of said side walls during final assembly such that interior facing surfaces of said side walls and said first portion are generally flush with one another.

13. The trim component of claim 1, further including mounting features integrally formed therein for mounting said trim component to another vehicular trim component.

14. The trim component of claim 13, wherein said mounting features are a plurality of outwardly extending tabs having apertures formed therein for accepting fasteners therethrough for fastening said trim component to another vehicular trim component.

15. A door panel assembly for a vehicle interior comprising;
    a door panel having an opening formed therein, said door panel defining a front and rear surface such that said front surface faces the interior of the vehicle; and
    a storage pocket assembly attached to said rear surface of door panel, said storage pocket assembly including:
        a first portion defining a back wall of the storage pocket;
        a second portion defining a pair of opposed side walls of the storage pocket, said second portion separated from said first portion by a living hinge formed integrally with said first and second portions, said living hinge permitting said first portion to pivot relative to said second portion during assembly of the storage pocket; and
        at least one fastening mechanism connecting said first portion to said second portion when said first portion is rotated about said living hinge to a final assembly position adjacent said second portion to form the storage pocket.

16. The door panel claim 15, wherein said trim component is formed from an injection molding operation such that said first portion, said second portion, and said living hinge are integrally formed of a common material.

17. The door panel of claim 15, wherein said trim component is initially formed such that said first portion extends outwardly from said second portion at said living hinge, and wherein said first portion is rotated approximately 180 degrees about said living hinge to the final assembly position to form the storage pocket.

18. The door panel of claim 15, wherein said back wall of said first portion is flocked, and wherein said side walls of said second portion are flocked.

19. The trim component of claim 15, wherein said at least one fastening mechanism is integrally formed in one of said first and second portions.

* * * * *